N. AYERS.
LEVER MECHANISM.
APPLICATION FILED AUG. 5, 1921.
1,392,618.
Patented Oct. 4, 1921.
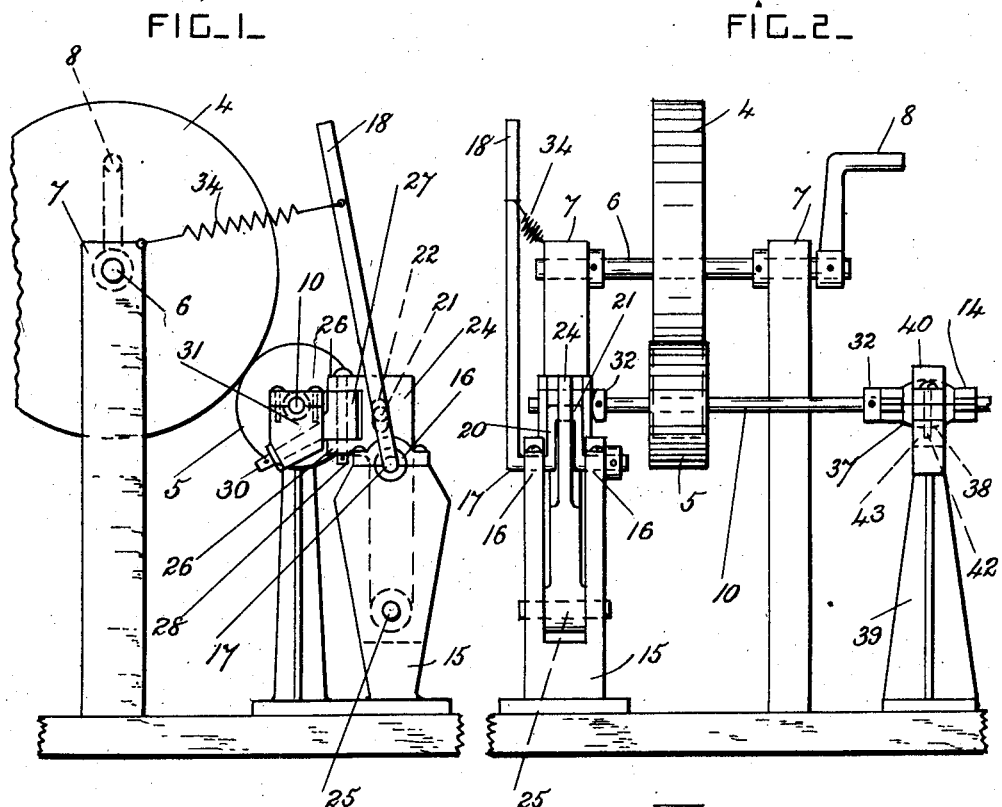
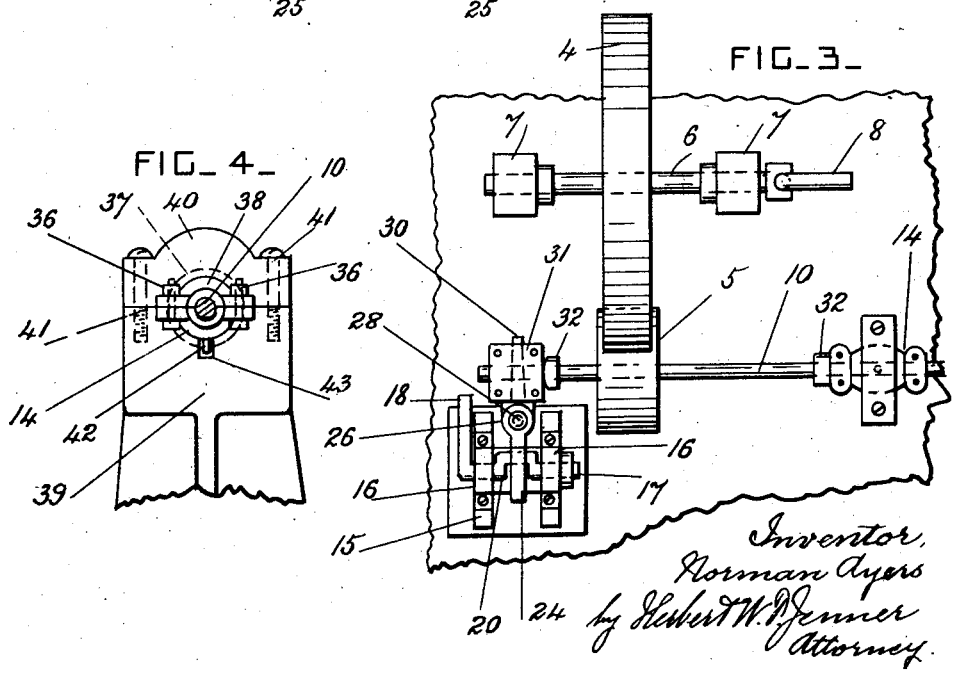
Inventor,
Norman Ayers
by Herbert W. Jenner
Attorney.

UNITED STATES PATENT OFFICE.

NORMAN AYERS, OF McARTHUR, OHIO.

LEVER MECHANISM.

1,392,618.  Specification of Letters Patent.   Patented Oct. 4, 1921.

Application filed August 5, 1921. Serial No. 489,995.

*To all whom it may concern:*

Be it known that I, NORMAN AYERS, a citizen of the United States, residing at McArthur, in the county of Vinton and State of Ohio, have invented certain new and useful Improvements in Lever Mechanism, of which the following is a specification.

This invention relates to lever mechanism such as used for placing friction driving wheels into and out of driving engagement with each other, said friction wheels being adapted for use on rigs used in drilling wells and also on other sorts of machinery. The lever mechanism hereinafter described is specially advantageous when used on rigs for drilling wells, certain portions of which are driven at high speed, and the invention consists in the novel construction and combination of the parts hereinafter fully described and claimed.

In the drawings, Figure 1 is a side view of a lever mechanism constructed according to this invention, Fig. 2 is a front view of the lever mechanism; and Fig. 3 is a plan view of the same. Fig. 4 is a detail side view of the ball and socket bearing for one end portion of the driving shaft.

Two friction driving wheels 4 and 5 are arranged face to face. The wheel 4 is secured on a shaft 6 journaled in stationary bearings 7, and provided with a crank or handle 8 for revolving it. The wheel 5 is secured on a shaft 10. One end portion of this shaft 10 is mounted in a bearing 14 so that the said shaft may be moved pivotally to place the wheel 5 into and out of driving engagement with the wheel 4. The other end portion of the shaft 10 is supported and operated so that the wheel 5 is driven by the wheel 4.

A stationary standard 15 is provided, and has two shaft bearings 16 at its top. A crankshaft 17 is journaled in the bearings 16, and an operating lever 18 is secured to one end of this crankshaft.

The crank 20 is arranged between the two bearings, and the crank-pin 21 engages with a slot 22 formed in the upper end portion of a lever 24. The lower end portion of the lever 24 is pivoted by a pin 25 to the standard 15. The lever 24 has rearwardly projecting lugs 26 on its upper end portion, and 27 is an eye which is pivoted between the two lugs 26 by a substantially vertical pin 28. A stub-shaft 30 projects laterally from the eye 27, and 31 is a bearing for the other end portion of the shaft 10. The bearing 31 is mounted pivotally on the stub-shaft 30, and the shaft 10 is provided with collars 32 which prevent it from sliding endwise in its bearings. The stub-shaft is preferably arranged tangentially of the periphery of the wheel 4.

A spring 34 is shown attached to the operating lever 18 and to one of the stationary bearings 7, and operates to hold the friction wheels in driving engagement with each other, but this spring may be omitted if desired.

The use of this lever mechanism with the stub-shaft 30 arranged at an angle to the pivot pin 28, and projecting crosswise of the lever pivot 25, enables the faces of the two friction wheels to bear evenly on each other when pressed together by the operating lever, and assures a satisfactory driving contact or engagement between the two friction wheels. This is specially advantageous when the shaft 10 is revolved at a high speed in a rig for drilling wells. The bearing 14 which supports one end portion of the shaft 10 is made of relatively great length in proportion to its diameter, and is formed of upper and lower halves connected by bolts 36 at its end portions. The middle portion 37 of the bearing is a portion of a ball or sphere, so that it will pivot freely in a correspondingly formed socket 38 in a stationary standard 39. This standard has a removable socket cap 40 secured by bolts 41, and permitting the bearing to be adjusted. The lower half of the bearing 14 has a downwardly projecting pin 42 at the middle of its length which works in a longitudinal groove 43 formed in the bottom of the socket 38. This pin permits the bearing to move pivotally in all directions, but prevents it from being revolved by the shaft 10.

What I claim is:

1. The combination, with a bearing, and a shaft having one end portion journaled therein; of a supporting standard provided with two bearings, a lever pivoted to the standard between the said two bearings and provided with a slot, a crankshaft journaled in the said two bearings and provided with a crank which engages with the slot and affords a means for moving the said lever pivotally, and a bearing for the other end portion of the first said shaft pivotally connected with the free end portion of the said lever.

2. The combination, with a bearing, and a shaft having one end portion journaled therein; of a supporting standard provided with two bearings, a lever arranged between the said two bearings and provided with a slot and having one end portion pivoted to the said standard, a crankshaft for moving the said lever pivotally journaled in the said two bearings and provided with a crank-pin which engages with the said slot, an eye pivoted to the other end portion of the said lever by a substantially vertical pin and provided with a laterally projecting stub-shaft, and a bearing for the other end portion of the first said shaft pivoted on the said stub-shaft.

3. The combination, with a stationary standard provided with a spherical socket, a bearing having a spherical portion which is mounted to move pivotally in the said socket, and a shaft having one end portion journaled in the said bearing; of a second standard, a lever having one end portion pivoted to the second standard, a stub-shaft pivotally connected with the other end portion of the said lever and arranged crosswise of its pivot, a bearing for the other end portion of the first said shaft pivoted on the said stub-shaft, and means for moving the said lever pivotally to oscillate the first said shaft.

4. The combination, with a stationary standard provided with a spherical socket, a bearing having a spherical portion which is mounted to move pivotally in the said socket, said bearing being formed in two adjustable halves and provided with a stop which prevents it from being revolved in the socket, and a shaft having one end portion journaled in the said bearing; of a second standard, a lever having one end portion pivoted to the second standard, a stub-shaft pivotally connected with the other end portion of the said lever and arranged crosswise of its pivot, a bearing for the other end portion of the first said shaft pivoted on the said stub-shaft, and means for moving the said lever pivotally to oscillate the first said shaft.

In testimony whereof I have affixed my signature.

NORMAN AYERS.